Sept. 25, 1962
T. D. TIEKEN
3,055,385
MILK PIPELINE VALVE
Filed Oct. 24, 1958
2 Sheets-Sheet 1
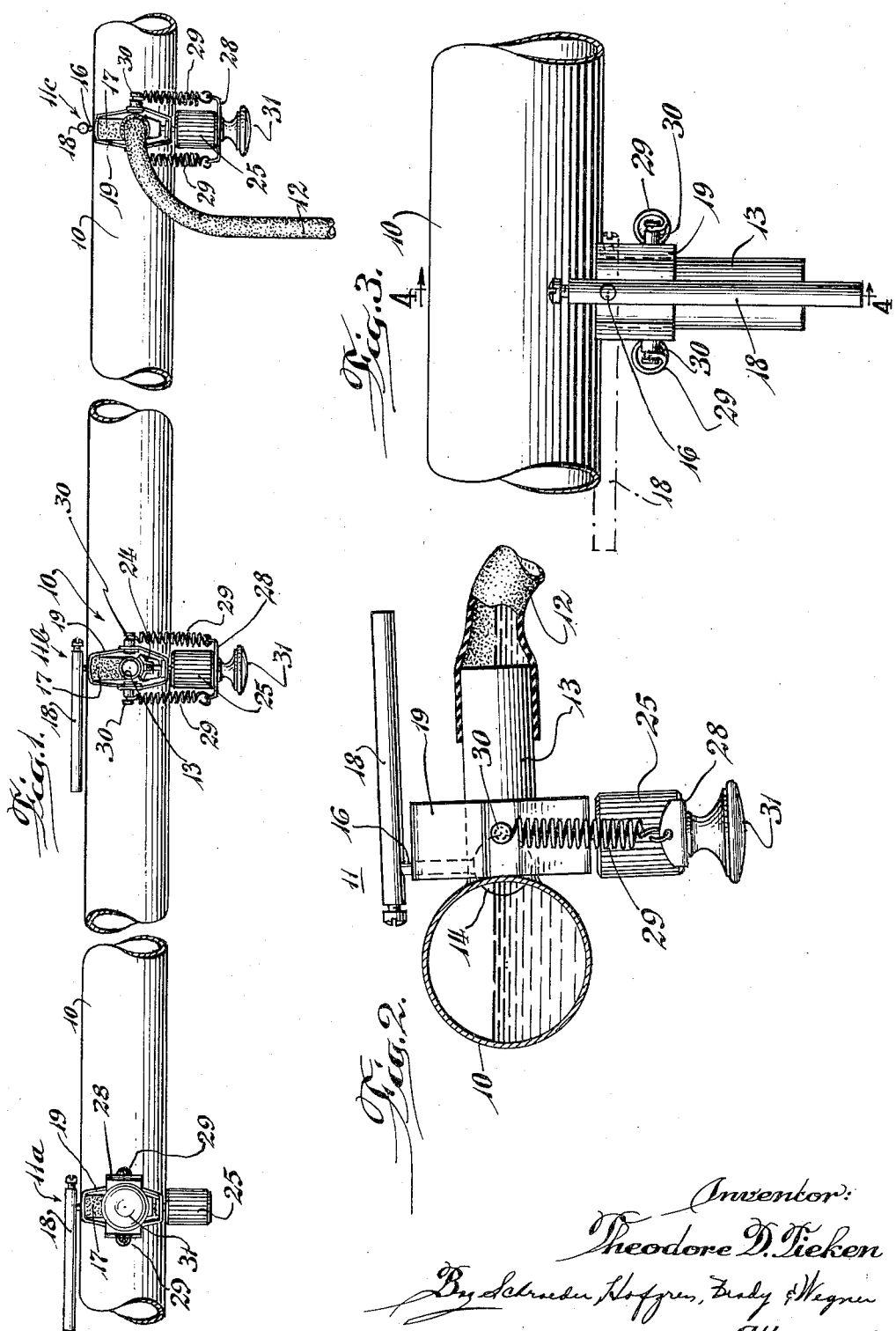
Inventor:
Theodore D. Tieken
By Schroeder, Hofgren, Brady & Wegner
Attorneys.

Sept. 25, 1962 T. D. TIEKEN 3,055,385
MILK PIPELINE VALVE
Filed Oct. 24, 1958 2 Sheets-Sheet 2
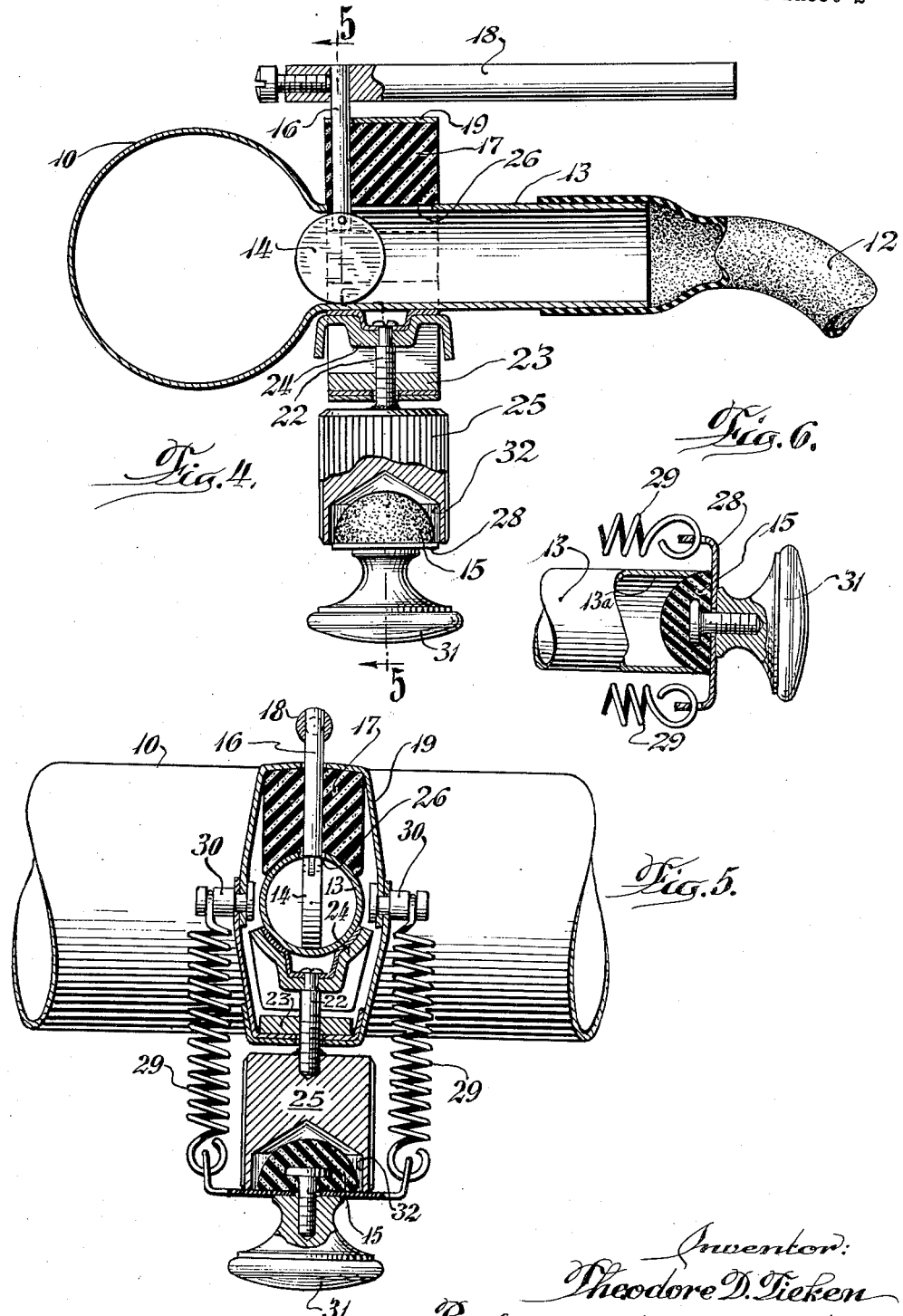
Inventor:
Theodore D. Tieken
By Schroeder, Hofgren, Brady & Wegner
Attorneys United States Patent Office 3,055,385
Patented Sept. 25, 1962

3,055,385
MILK PIPELINE VALVE
Theodore D. Tieken, Chicago, Ill., assignor to Babson Bros. Co., a corporation of Illinois
Filed Oct. 24, 1958, Ser. No. 769,496
1 Claim. (Cl. 137—381)

This invention relates to a valve or stall cock for a carry-away milk pipeline system.

Carry-away milking installations utilize an evacuated milk handling pipeline through which milk flows to handling apparatus or storage tanks. Valves, sometimes referred to as "stall cocks," are placed at intervals along the pipeline and have a connector element, as a nipple, to which the milk hose from the milk withdrawing apparatus is connected. For example, in a stanchion barn the pipeline extends along the stanchion stalls, generally over the top of the front of the stalls, and may have one valve for every two stalls. Many of the valves previously proposed for this application have sealing surfaces which are relatively inaccessible for washing, or have other unsanitary features, or are of extremely expensive construction.

It is a principal object of the present invention to provide a novel, sanitary, easily cleaned and inexpensive valve construction.

One feature of the invention is that the valve includes a valve body with a first valve member having a loose fit therein and a second valve member sealed therewith. Another feature is that the second valve member seals with the inlet of the valve body and is readily accessible for washing. A further feature is that the valve body is a nipple secured to the pipeline having a first valve member with a loose fit inside, and a second valve member sealed with the open end thereof.

Yet another feature is the provision of a guard for the seal member when it is removed from the open end of the nipple.

Still a further feature is that the first valve member is a butterfly valve in the nipple, preferably located substantially at the joint between the nipple and the pipeline and which when open extends into the pipeline, deflecting washing solution flowing through the pipeline into the nipple, cleaning it.

Further features and advantages will readily be apparent from the following specification and from the drawings, in which:

FIGURE 1 illustrates a series of fragmentary sections of pipeline with a plurality of valves embodying the invention mounted thereon;

FIGURE 2 is an elevational view of a valve embodying the invention;

FIGURE 3 is a plan view thereof;

FIGURE 4 is a section taken generally along line 4—4 of FIGURE 3;

FIGURE 5 is a section taken generally along line 5—5 of FIGURE 4; and

FIGURE 6 is a fragmentary sectional view of the inlet end of the nipple with the sealing member in place.

Sanitary regulations for dairy farms require that carry-away milk pipelines be thoroughly washed and rinsed following each milking operation. In recent years, great advances have been made with "in-place" washing systems which do not require the disassembly of the pipeline itself, as was formerly necessary. However, the valves or stall cocks used with the pipeline have continued to present a washing problem, as they include sealing surfaces with cracks and crevices affording a lodging place for milk and bacteria. Many of the prior stall cocks have been complicated devices, difficult to disassemble and hard to wash adequately even when disassembled and scrubbed with brushes. Of course, a washing operation that takes a substantial amount of manual labor is not so likely to be done properly as one which may be done easily, particularly where the work is done by hired hands. The stall cock disclosed herein is primarily self-washing, as will appear, and in addition, it is easy to disassemble so that the parts may be scrubbed with brushes periodically to insure complete cleanliness.

Turning now to the drawings, in FIGURE 1, a section of pipeline 10 is illustrated having three valves 11a, 11b and 11c mounted thereon. Valve 11a is shown in the closed position, valve 11b has the sealing member removed and the first valve member closed, while valve 11c has both valve members open and a milk hose 12 attached.

The valve 11 includes a valve body 13 which preferably takes the form of a nipple secured to the pipeline 10, slightly above a horizontal position to facilitate drainage. Two valve members, a butterfly valve 14 and a sealing member 15 (FIGURE 6) are associated with the valve body 13.

The first or butterfly valve member 14 is carried on a rod 16 which extends through and is rotatably supported by a block 17 of resilient material, as neoprene rubber. An operating handle 18 is secured to the upper end of rod 16. The block 17 is secured to the upper surface of nipple 13 by a clamping band 19 which encircles the block and the nipple. A threaded stud 22 extends through a plate 23 inside the lower portion of the band and carries a shoe 24 which seats on the under-surface of the nipple. An enlarged, preferably knurled, block 25 at the outer end of stud 22 may be turned manually to tighten the band 19 securing the resilient block 17 and butterfly valve 14 in place on the nipple. The block 17 has sufficient extent along the length of the nipple 13 to seal the opening 26 through which the butterby valve is inserted into the nipple.

The butterfly valve 14 has a rather loose fit inside the body of nipple 13 so that there are no actual sealing surfaces between the two. The primary function of the butterfly is to prevent a large inrush of outside air when the sealing member 15 is removed from the end of the nipple.

The sealing member 15, here shown as a button or stopper-like body of resilient material is carried on a cross arm 28 secured to the valve assembly by a pair of springs 29 connected between the ends of the cross arm and extensions 30 on either side of the band 19. An operating member 31 is secured to the sealing member 15 and cross arm 28 to facilitate removal of the sealing member from the end 13a of the nipple.

When sealing member 15 is sealed in the open end of the nipple, springs 29, together with the evacuated condition of the pipeline insure a tight, leak-proof connection. To remove the sealing member it is merely necessary that the operator pull outwardly on operating member 31 against the force of springs 29 and move the sealing member 15 away from the open inlet end 13a of nipple 13.

It is desirable that the surface of sealing member 15 which is exposed to contact with milk be shielded from contact with unclean surfaces and insects or the like when it is removed from the end of the nipple. Accordingly, a recess 32 is provided in the band tightening member 25, which serves as a guard for sealing member 15. The operator merely swings the sealing member 15 downwardly after removal of the nipple and allows the springs 29 to pull it into recess 32. It will be noted that the recess 32 is larger than the inlet opening 13a of the nipple, so that the entire surface of sealing member 15 and particularly those portions which come into contact with milk and the interior of the nipple, are free from contact when in this second position.

In operation, when the valve or stall cock is not in use, as shown at 11a in FIGURE 1, sealing member 15 is seated in the open end 13a of the nipple and butterfly valve 14 is closed. When the stall cock is to be used, sealing member 15 is removed from the end of the nipple and placed in its second position (FIGURES 4 and 5) while the butterfly valve 14 remains closed. This condition is illustrated at 11b, FIGURE 1. The milk hose from the milking equipment is next attached to nipple 13, and after this has been done butterfly valve 14 may be opened to apply vacuum to the milking apparatus and to accommodate flow of milk from the milking apparatus into the pipeline. This is shown at 11c in FIGURE 1.

The slight amount of air which enters the system has as a result a loose fit between butterfly valve 14 and nipple 13 is not objectionable, and hidden sealed surfaces which are difficult to wash, either automatically or by disassembling the entire valve and scrubbing the parts, are eliminated.

It will be noted from FIGURE 2, that butterfly valve 14 extends a slight distance into the pipeline 10 when in its open position. When the pipeline is cleaned by circulating a washing solution through it, valve 14 may be moved to the open position whereby it deflects a certain amount of the washing solution into nipple 13 to wash the interior. Sealing member 15 is, of course, left in place on the end of the nipple during this operation. The interior of the valve assembly may easily be scrubbed by removing the sealing member and inserting a brush into the nipple. Not only the interior walls of the nipple may be brushed, but if the butterfly valve 14 is open, both of its faces may be cleaned. At the same time, the sealing surfaces of member 15 may be scrubbed. Thus, the entire valve may be scrubbed without an involved disassembly and reassembly of the parts. Furthermore, if it should be necessary to take the valve apart this is easily done by loosening band 19 whereupon the butterfly valve 14 may be slipped out through the opening 26 in the top of the nipple.

While I have shown and described certain embodiments of my invention, it is to be understood that it is capable of many modifications. Changes therefore, in the construction and arrangement may be made without departing from the spirit and scope of the invention as disclosed in the appended claim.

I claim:

A valve for an evacuated milking system, comprising: a nipple having a flow passage therethrough, there being an opening in the wall of the nipple intermediate the ends thereof; a butterfly valve including a member carried in said nipple between the ends thereof and having a stem extending through said opening in the wall of the nipple, the butterfly valve member being rotatable about an axis through said stem between a first position and extending across said nipple retarding flow through the passage and a second position generally aligned with the nipple, the valve member of the butterfly valve having a peripheral edge portion spaced from the interior wall of the nipple throughout substantially the entire periphery of the disc when in said first position; a body of resilient material surrounding said valve stem; means interconnecting said body and said nipple, said means comprising a strap surrounding said nipple and body of resilient material, compressing the body against the nipple providing a seal across said opening and about said stem; a removable closure having a position in sealed engagement with the open end of said nipple; and a recessed guard for said closure carried by said strap, said closure being mounted on said strap by a spring connected therebetween, said closure being movable between a position in sealed engagement with the open end of the nipple and a position with sealing surface thereof received in the recess of said guard.

References Cited in the file of this patent

UNITED STATES PATENTS

| | | |
|---|---|---|
| 851,990 | Leach | Apr. 30, 1907 |
| 1,104,972 | Dover | July 28, 1914 |
| 1,166,202 | Geisel | Dec. 28, 1915 |
| 2,636,518 | Strebel | Apr. 28, 1953 |
| 2,676,604 | Sienna | Apr. 27, 1954 |
| 2,763,459 | Anderson | Sept. 18, 1956 |
| 2,815,039 | Pickavance | Dec. 3, 1957 |

FOREIGN PATENTS

| | | |
|---|---|---|
| 396,691 | France | Feb. 2, 1909 |